(12) United States Patent
Amada

(10) Patent No.: US 8,031,362 B2
(45) Date of Patent: Oct. 4, 2011

(54) OPTICAL SCANNING DEVICE, IMAGE FORMING APPARATUS, AND LIQUID CRYSTAL ELEMENT

(75) Inventor: Taku Amada, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 938 days.

(21) Appl. No.: 11/543,092

(22) Filed: Oct. 5, 2006

(65) Prior Publication Data

US 2007/0081152 A1    Apr. 12, 2007

(30) Foreign Application Priority Data

Oct. 7, 2005   (JP) ................................. 2005-295330

(51) Int. Cl.
*G06K 15/12* (2006.01)

(52) U.S. Cl. .......... 358/1.7; 358/1.1; 347/224; 347/241; 347/256

(58) Field of Classification Search .................. 358/1.1, 358/1.7; 347/241, 256, 224; 359/204, 196
See application file for complete search history.

(56) References Cited

U.S. PATENT DOCUMENTS

| | | | |
|---|---|---|---|
| 7,050,082 B2 | 5/2006 | Suzuki et al. | |
| 7,145,589 B2 * | 12/2006 | Amada et al. | 347/241 |
| 7,206,014 B2 * | 4/2007 | Amada et al. | 347/242 |
| 7,333,254 B2 * | 2/2008 | Amada et al. | 359/196.1 |
| 7,403,316 B2 * | 7/2008 | Amada | 359/204.1 |
| 7,460,145 B2 * | 12/2008 | Amada et al. | 347/241 |
| 7,505,060 B2 * | 3/2009 | Amada et al. | 347/241 |
| 7,525,561 B2 * | 4/2009 | Nakajima et al. | 347/234 |
| 7,532,227 B2 * | 5/2009 | Nakajima et al. | 347/241 |
| 2003/0156310 A1 * | 8/2003 | Suzuki et al. | 359/196 |
| 2004/0032631 A1 * | 2/2004 | Amada et al. | 359/204 |
| 2004/0036936 A1 * | 2/2004 | Nakajima et al. | 359/204 |
| 2004/0057096 A1 | 3/2004 | Amada et al. | |
| 2005/0179971 A1 * | 8/2005 | Amada et al. | 359/196 |
| 2006/0132880 A1 * | 6/2006 | Amada et al. | 359/196 |
| 2006/0209166 A1 * | 9/2006 | Suzuki et al. | 347/231 |
| 2006/0232660 A1 * | 10/2006 | Nakajima et al. | 347/243 |
| 2007/0097474 A1 * | 5/2007 | Amada et al. | 359/204 |
| 2007/0189008 A1 * | 8/2007 | Amada et al. | 362/227 |
| 2008/0117487 A1 * | 5/2008 | Amada et al. | 359/204 |
| 2008/0170282 A1 * | 7/2008 | Amada et al. | 359/196 |

(Continued)

FOREIGN PATENT DOCUMENTS

JP    2-289815    11/1990

(Continued)

OTHER PUBLICATIONS

U.S. Appl. No. 12/051,404, filed Mar. 19, 2008, Amada, et al.

*Primary Examiner* — Twyler Haskins
*Assistant Examiner* — Fred Guillermety
(74) *Attorney, Agent, or Firm* — Oblon, Spivak, McClelland, Maier & Neustadt, L.L.P.

(57) ABSTRACT

A disclosed optical scanning device scans an object scanning surface with a light beam projected from a light source and traveling through an optical system. The optical scanning device includes a liquid crystal element configured to modulate a phase. The liquid crystal element is driven by electric signals and provided on a light path between the light source and the object scanning surface. The liquid crystal element generates different power components in a main scanning direction and a sub scanning direction under temperature variations.

22 Claims, 10 Drawing Sheets

U.S. PATENT DOCUMENTS

| | | | |
|---|---|---|---|
| 2008/0204852 A1* | 8/2008 | Amada et al. | 359/279 |
| 2009/0052944 A1* | 2/2009 | Kubo et al. | 399/220 |
| 2009/0060583 A1* | 3/2009 | Amada et al. | 399/221 |

FOREIGN PATENT DOCUMENTS

| | | |
|---|---|---|
| JP | 3-116112 | 5/1991 |
| JP | 5-19190 | 1/1993 |
| JP | 9-131920 | 5/1997 |
| JP | 2001-166237 | 6/2001 |
| JP | 2002-341270 | 11/2002 |
| JP | 2003-302595 | 10/2003 |
| JP | 2003-337293 | 11/2003 |
| JP | 2004-109699 | 4/2004 |
| JP | 2004-109700 | 4/2004 |
| JP | 2005107128 A * | 4/2005 |

* cited by examiner

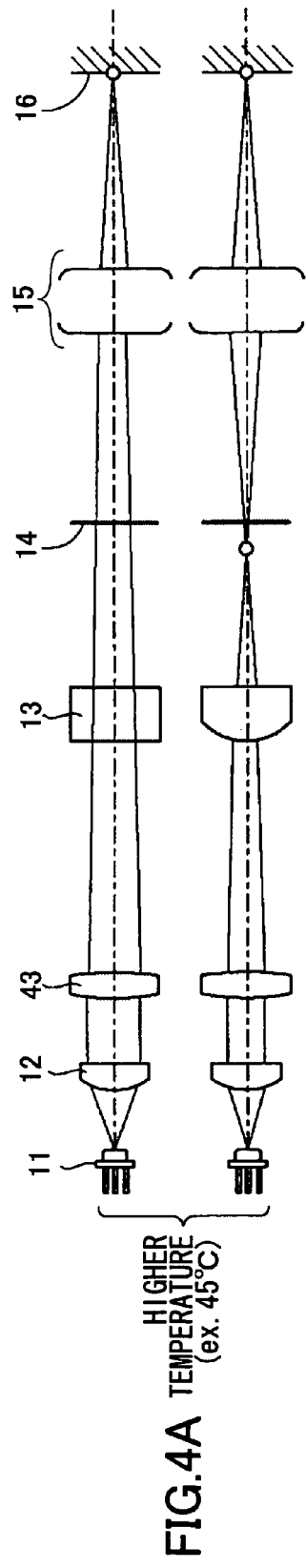
FIG.4A HIGHER TEMPERATURE (ex. 45°C)
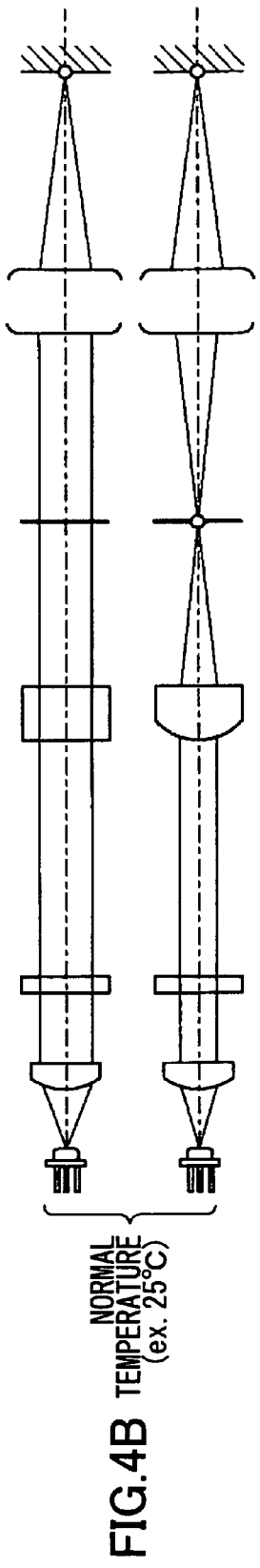
FIG.4B NORMAL TEMPERATURE (ex. 25°C)
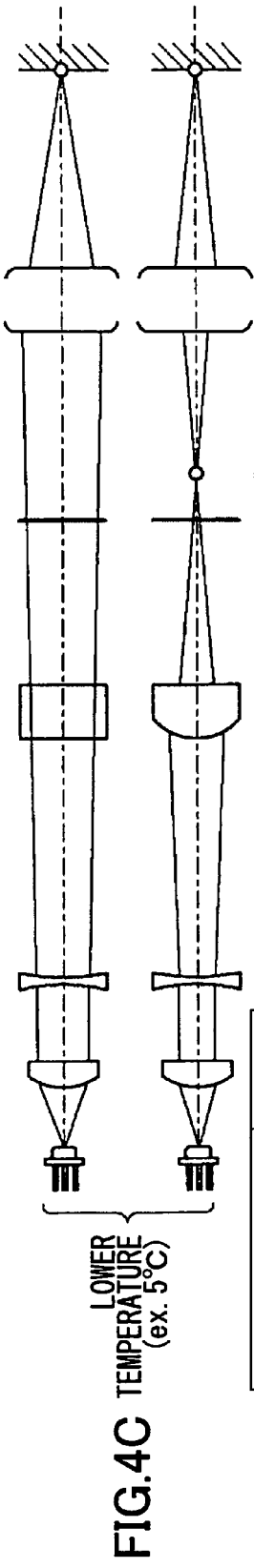
FIG.4C LOWER TEMPERATURE (ex. 5°C)

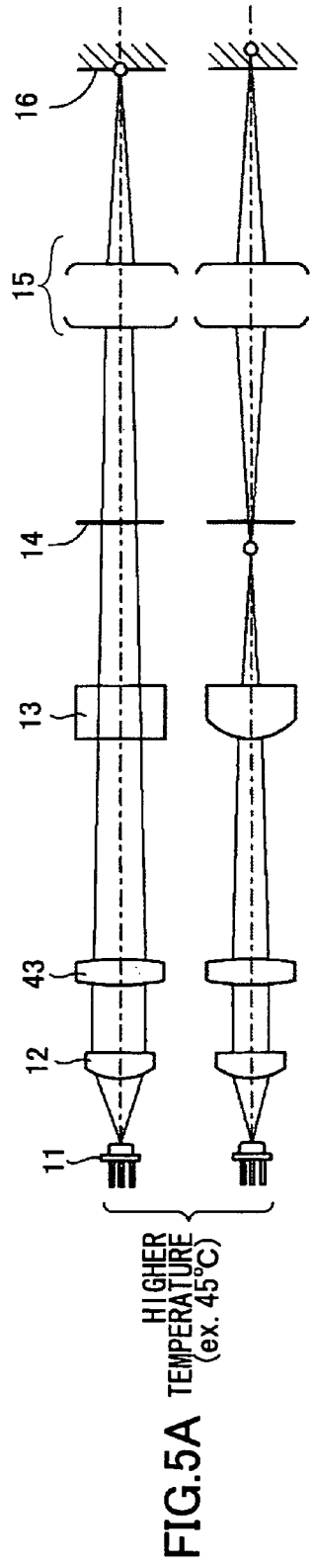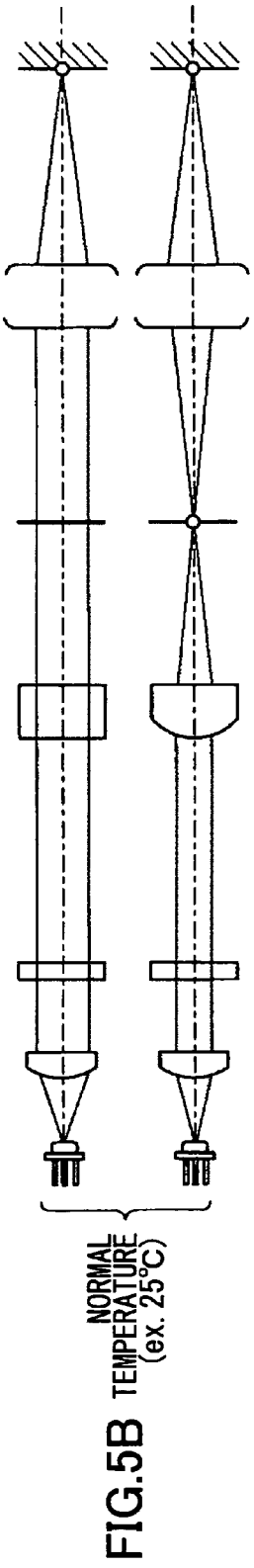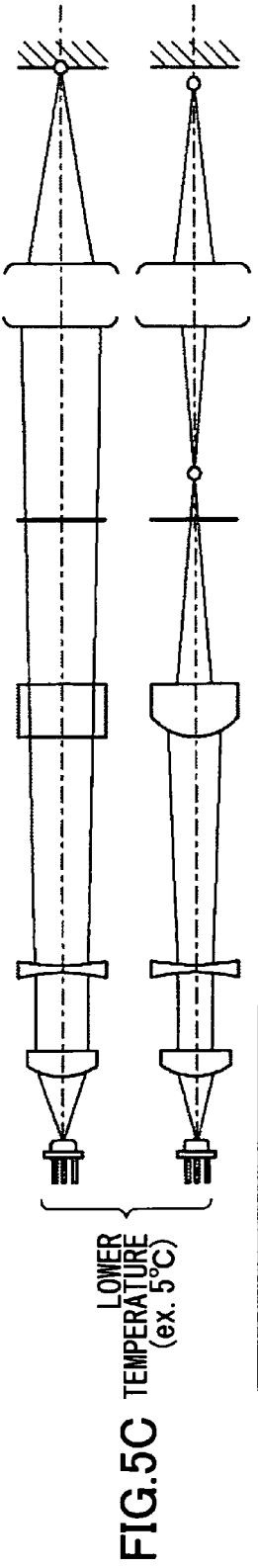

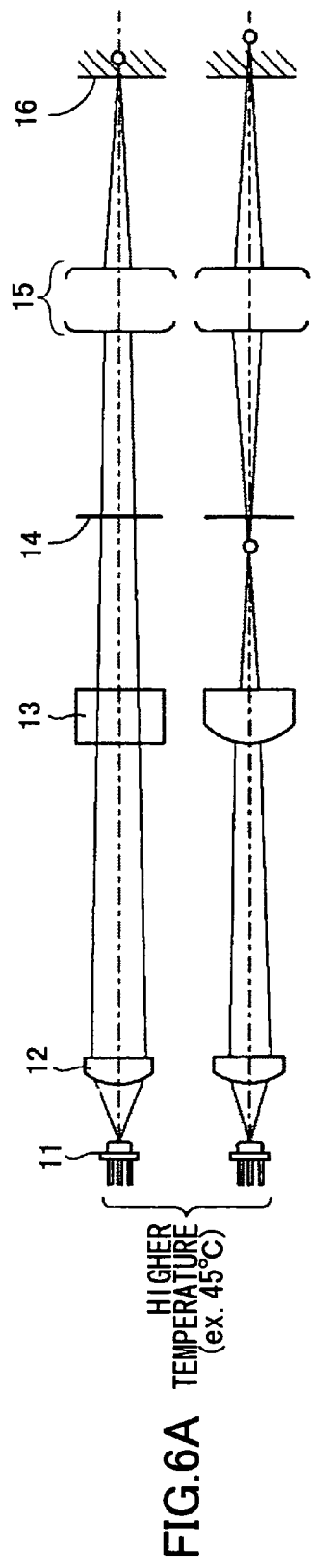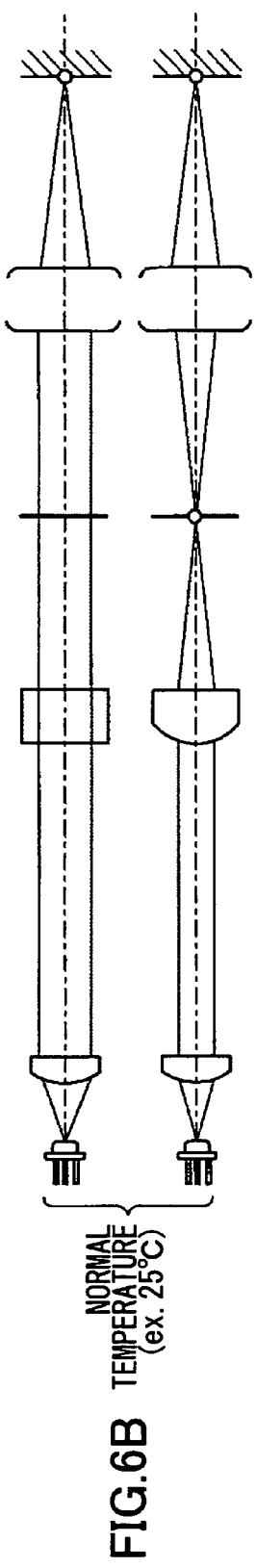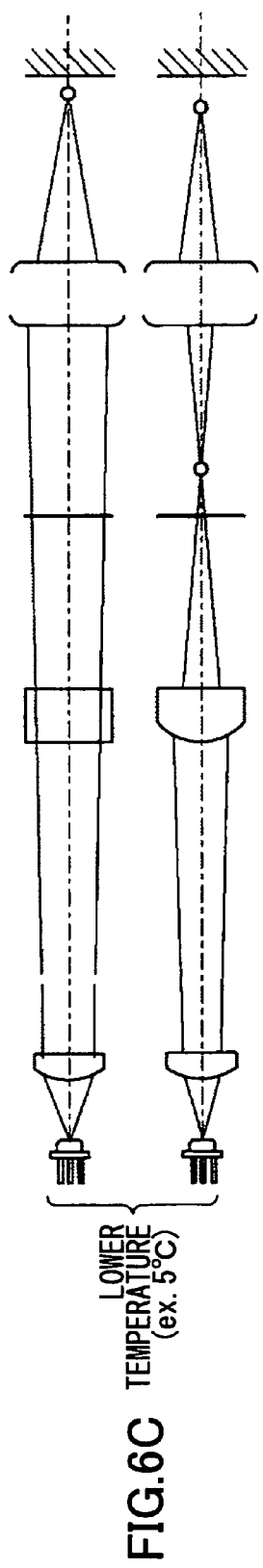

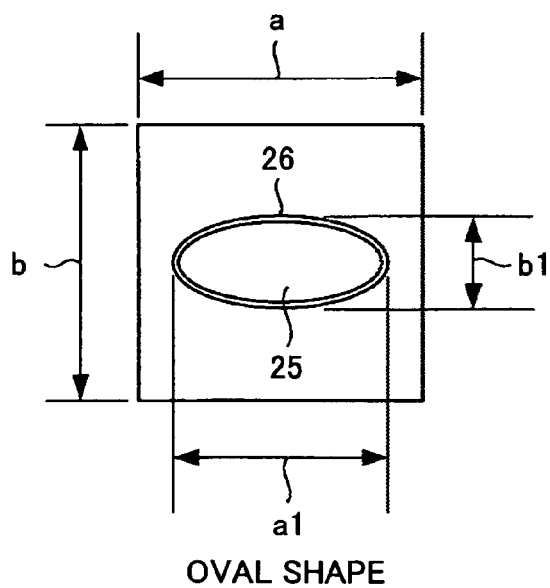 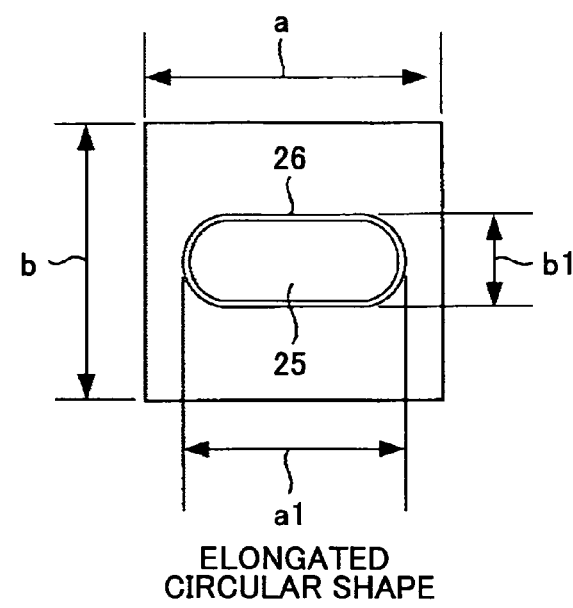
FIG.7A OVAL SHAPE
FIG.7B ELONGATED CIRCULAR SHAPE

OPTICAL SCANNING DEVICE, IMAGE FORMING APPARATUS, AND LIQUID CRYSTAL ELEMENT

BACKGROUND OF THE INVENTION

1. Field of the Invention

The present invention relates to an optical scanning device functioning as an optical writing unit, an image forming apparatus including the optical scanning device such as a copier, a printer, a facsimile machine, and a plotter, and a liquid crystal element used in the optical scanning device.

2. Description of the Related Art

[Multi-Beam Scanning Device]

In recent years and continuing, image forming apparatuses such as LBPs (laser beam printer) and copiers are forming images of higher quality at higher speed, and color copying is becoming widespread. Accordingly, users are requiring higher quality.

To address the requirements for higher speed, it is effective to employ multi-beams. However, when multi-beams are employed, the pitch (scanning line intervals) between plural beams needs to be adjusted. The pitch between plural beams can be adjusted with a method of rotating a multi-beam light source unit around an optical axis or a method of employing an optical element used for adjusting the pitch (see, for example, Patent Document 1).

To address the requirements for higher quality, beam spots need to have small diameters, and several methods have been proposed (see, for example, Patent Documents 2 through 4). However, in the process of making the diameters of the beam spots small, it is necessary to take into consideration the temperature variations, based on various heat sources such as a fixing unit and a polygon scanner included in an image forming apparatus or an optical scanning device, and temperature variations in the environment.

However, in the conventional method of rotating a multi-beam light source unit around an optical axis, the reliability of electrical components becomes a problem, because the light source unit itself is rotated. The conventional method of employing an optical element used for adjusting the pitch requires a highly precise optical element made of glass, which leads to higher costs.

Even if the beam spot position is initially adjusted in a highly precise manner, when the temperature starts to vary, beam spot positions are displaced with passage of time.

Accordingly, a unit-for adjusting the pitch, i.e., a "liquid crystal element" driven by electric signals, has been proposed. A beam pitch detecting unit provided separately detects the beam pitch, and the liquid crystal element is driven based on the detection results. Thus, when the beam pitch changes with passage of time, the liquid crystal element can correct the change. The liquid crystal element is a beam pitch adjusting unit that can be driven at low voltage, does not generate heat, noise, or vibration, and is compact and lightweight.

[Tandem-Type Color Image Forming Apparatus]

In recent years and continuing, optical elements in scanning optical systems are often made of plastic. Although plastic is advantageous in terms of mass production, final plastic products are often deformed from ideal shapes. The deformation is caused by uneven temperature distributions of the mold when being molded, and/or the plastic products are not uniformly cooled after being removed from the mold.

Scanning optical systems often include optical elements that are longer in a main scanning direction than in a sub scanning direction. Therefore, the optical elements sometimes bend in the sub scanning direction. This may cause positional displacement of scanning lines with respect to the sub scanning direction, such as tilted scanning lines and/or bent scanning lines, depending on how the optical elements are held. Further, errors in mounting an optical element in a housing may also cause considerable positional displacement of scanning lines with respect to the sub scanning direction on the scanning surface.

Further, in an image forming apparatus including plural scanning units, temperature deviations between housings that hold and fix each of the scanning units may cause different amounts of positional displacement of scanning lines with respect to the sub scanning direction, such as bent scanning lines.

There is proposed a method of performing scanning by making plural light beams enter a single optical deflector and arranging optical elements so as to overlap each other in the sub scanning direction (a method of holding all scanning units inside a single optical housing). This method also causes different amounts of positional displacement of scanning lines with respect to the sub scanning direction between photoconductors, such as tilted scanning lines and bent scanning lines. The displacement occurs due to deformation and mounting errors of the scanning optical system, and temperature distributions within a single housing.

In a tandem-type full-color copier, four photoconductive drums are arranged in a row along a conveyance surface of a transfer belt, corresponding to cyan (C), magenta (M), yellow (Y), and black (K). Beam scanning devices scan the photoconductive drums with corresponding beams, thereby forming electrostatic latent images on the circumferential surfaces of the photoconductive drums. The latent images are made visible with toner of corresponding colors. The visible toner images are sequentially transferred onto a recording sheet conveyed by the transfer belt so as to form a full-color image. Thus, if scanning line positions are displaced in the sub scanning direction by different amounts between the colors, image quality is degraded and color deviations occur.

Patent Document 1: Japanese Laid-Open Patent Application No. H9-131920

Patent Document 2: Japanese Laid-Open Patent Application No. H3-116112

Patent Document 3: Japanese Laid-Open Patent Application No. H5-19190

Patent Document 4: Japanese Laid-Open Patent Application No. 2001-166237

Patent Document 5: Japanese Laid-Open Patent Application No. 2004-109700

Patent Document 6: Japanese Laid-Open Patent Application No. H9-131920

Patent Document 7: Japanese Laid-Open Patent Application No. 2004-109699

Patent Document 8: Japanese Laid-Open Patent Application No. 2003-337293

A liquid crystal element has a cell structure in which a liquid crystal layer of several μm to several tens μm in size is sealed by two glass substrates. Therefore, as the temperature rises in the environment, the liquid crystal layer having a relatively high expansion coefficient expands due to heat, and the middle part of the liquid crystal element expands. As a result, a lens effect (positive power) is generated.

Accordingly, beam waist positions are displaced, which disadvantageously leads to larger beam spot diameters.

SUMMARY OF THE INVENTION

The present invention provides an optical scanning device, an image forming apparatus, and a liquid crystal element in which one or more of the above-described disadvantages is eliminated.

A preferred embodiment of the present invention provides a low-cost optical scanning device that can ensure precision of beam spot positions even when the temperature varies (in the case of a multi-beam scanning device, capable of preventing beam pitch variations).

A preferred embodiment of the present invention provides an image forming apparatus employing the optical scanning device described above, with which high-quality images can be produced.

A preferred embodiment of the present invention provides a liquid crystal element with which the optical scanning device described above can be realized.

An embodiment of the present invention provides an optical scanning device for scanning an object scanning surface with a light beam projected from a light source and traveling through an optical system, the optical scanning device including a liquid crystal element configured to modulate a phase, the liquid crystal element being driven by electric signals and provided on a light path between the light source and the object scanning surface, wherein the liquid crystal element generates different power components in a main scanning direction and a sub scanning direction under temperature variations.

An embodiment of the present invention provides an image forming apparatus for forming an image on an image carrier by using as an exposing device the optical scanning device according to the present invention.

An embodiment of the present invention provides a liquid crystal element used in the optical scanning device according to the present invention.

According to one embodiment of the present invention, beam waist positions are made to be displaced by different amounts in a main scanning direction and a sub scanning direction under temperature variations, thereby preventing displacement of beam waist positions in the main scanning direction and the sub scanning direction.

Further, by applying an embodiment of the present invention to a tandem-type color image forming apparatus, color deviations can be reduced.

Further, deformation of shapes of beam spots on an object scanning surface (photoconductive drum surface) caused by temperature variations can be prevented.

BRIEF DESCRIPTION OF THE DRAWINGS

Other objects, features and advantages of the present invention will become more apparent from the following detailed description when read in conjunction with the accompanying drawings, in which:

FIGS. 4A through 4C are linearly unfolded diagrams of light paths;

FIGS. 5A through 5C are linearly unfolded diagrams of light paths of a comparative example;

FIGS. 6A through 6C are linearly unfolded diagrams of light paths in an optical scanning device without a liquid crystal element;

FIGS. 7A, 7B are schematic diagrams of shapes of liquid crystal elements according to a second embodiment of the present invention;

DETAILED DESCRIPTION OF THE PREFERRED EMBODIMENTS

A description is given, with reference to the accompanying drawings, of an embodiment of the present invention.

A first embodiment according to the present invention is described with reference to FIGS. 1 through 6.

[Outline of Optical Scanning Device]

(Basic Structure of Optical Scanning Device)

Generally, a "main scanning direction" refers to a direction in which beam spots are scanned on an object scanning surface, and a "sub scanning direction" refers to a direction orthogonal to the main scanning direction. However, in this specification, a "main scanning direction" and a "sub scanning direction" have broader meanings, referring to directions corresponding to a main scanning direction and a sub scanning direction, respectively, with respect to the object scanning surface at various positions along a light path.

Figure 1:
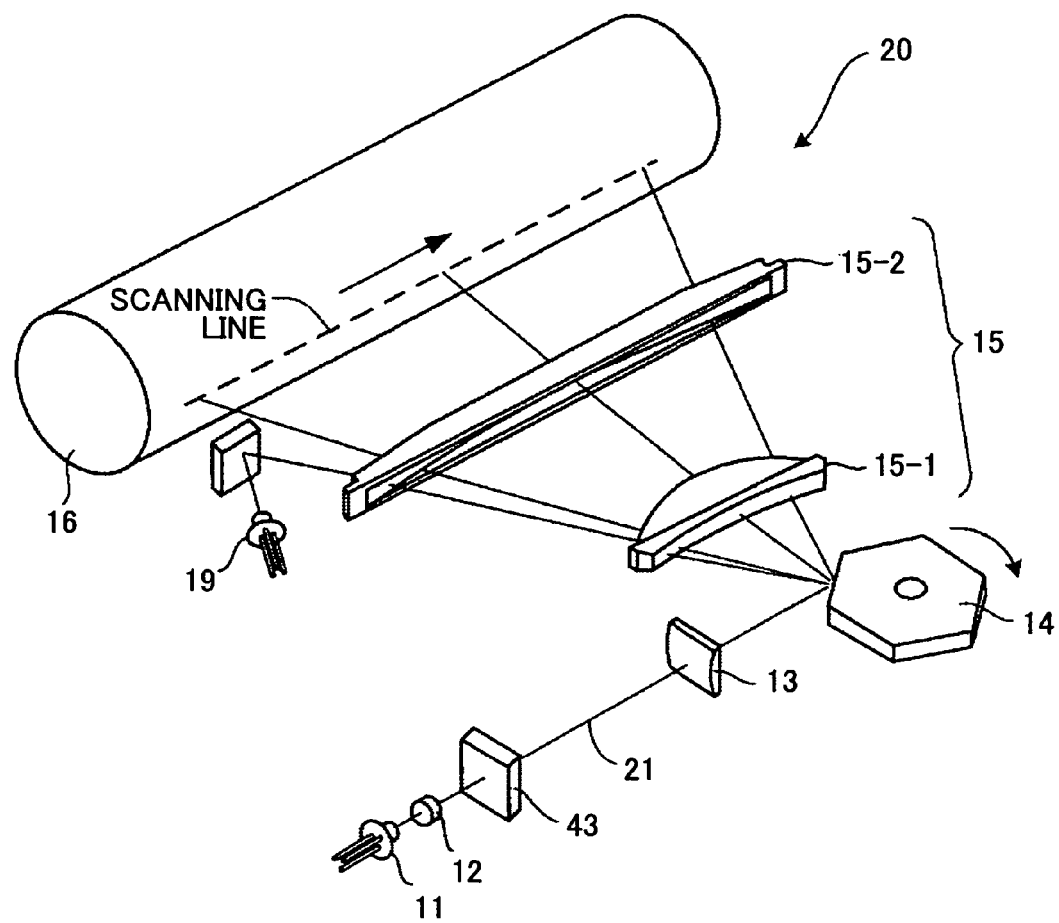
FIG. 1 is a perspective view of an optical scanning device according to a first embodiment of the present invention.
Figure 2:
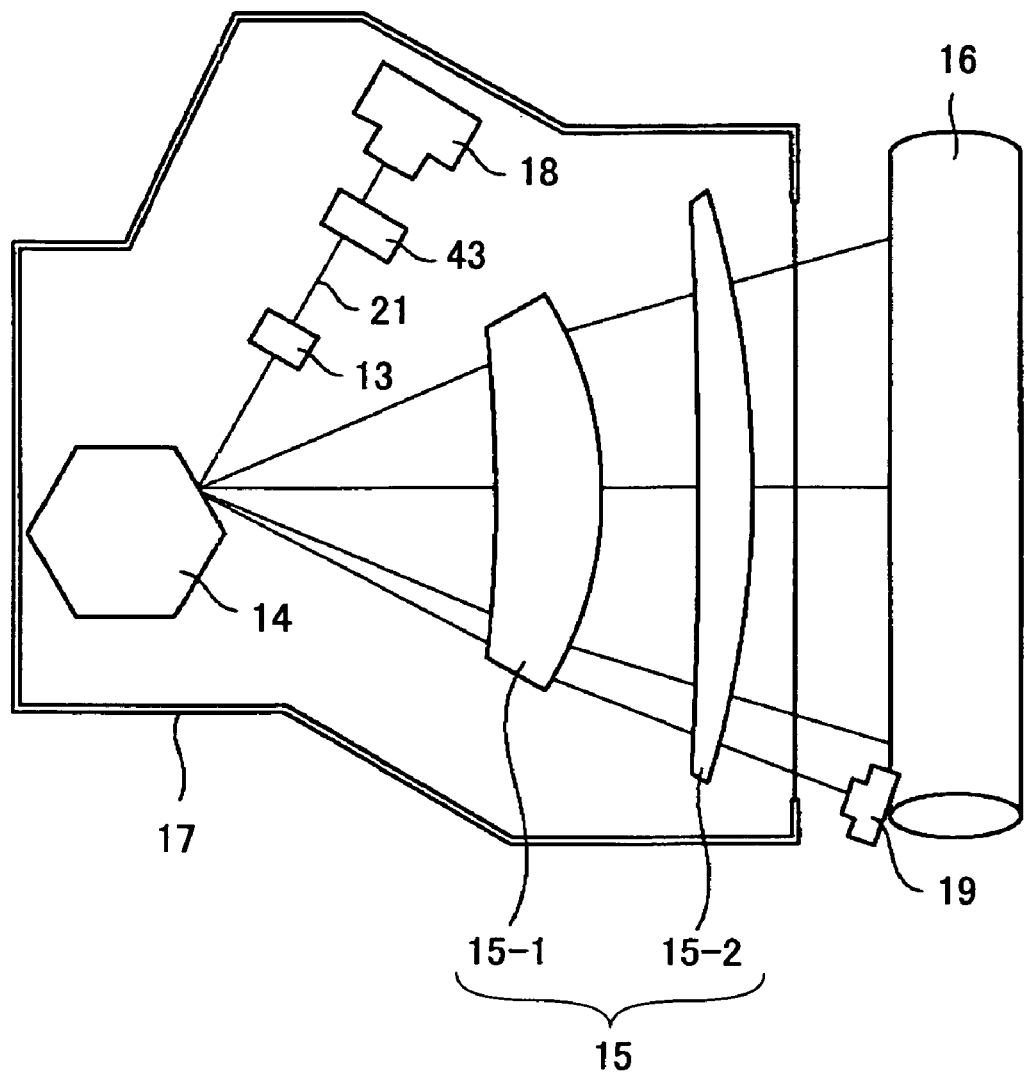
FIG. 2 is a schematic diagram along a main scanning direction.

FIGS. 1 and 2 are schematic diagrams of one example of an "optical scanning device" employed in an image output apparatus. An optical scanning device 20 according to the first embodiment scans an object scanning surface with a single laser beam projected from a single light source. However, the technology according to the present invention can also be applied to a "multi-beam optical scanning device", in which plural laser beams are projected from plural light sources (e.g., a semiconductor laser array). The technology according to the present invention can also be applied to an optical scanning device used in a tandem-type color image forming apparatus including plural object scanning surfaces (photoconductors).

A laser beam 21 is projected from a light source, i.e., a semiconductor laser 11, and travels through a coupling lens 12. The laser beam 21 is focused as a line image (focused in a sub scanning direction, and longitudinal in the main scanning direction) on a deflecting reflection surface of a polygon mirror 14 (i.e., a deflector) by the function of a cylindrical lens 13. A scanning optical system (scanning lenses) 15 causes the laser beam 21 to scan an object scanning surface (photoconductive drum surface) 16 as a beam spot. A write start timing in the main scanning direction is determined based on a synchronism detection signal output when the laser beam 21 is incident on a synchronism detecting sensor 19. The above optical elements are typically housed in an optical housing 17 as shown in FIG. 2.

(Optical Scanning Device Including Liquid Crystal Element Capable of Adjusting Sub Scanning Beam Spot Positions)

Optical scanning devices, particularly multi-beam scanning devices, are often equipped with an "optical beam position correcting unit" for performing initial adjustments of beam spot positions on an object scanning surface and correcting changes in beam spot positions caused by changes in the environment or passage of time.

A basic structure of the optical beam position correcting unit performs functions including the following:
a return mirror is rotated
a cylindrical lens is moved/rotated
a prism is moved/rotated
an electric optical element, AOM are used a parallel plate arranged between a semiconductor laser and a coupling lens is rotated.

These functions are conventionally proposed for a "light path deflecting unit" for deflecting a light path (deflect a laser beam by a slight angle).

However, with the conventional methods, a large-sized device is required, excessive electricity is consumed, and heat and noise are generated.

Accordingly, as shown in FIG. 1, according to the first embodiment, a liquid crystal element 43 is employed as a light path deflecting-unit that is compact, light weight, energy-saving, noise-free, and heat-free.

Liquid crystal elements have a function of "modulating phases", and are thus capable of modulating phases of laser beams incident on the liquid crystal elements. A liquid crystal element can be configured to include modulating a phase with a gradient in the sub scanning direction based on electric signals received from outside.

Such a liquid crystal element can be used as a light path deflecting unit that defects a laser beam by a slight angle (in the sub scanning direction), i.e., as a "deflecting element". By using the liquid crystal element 43 shown in FIG. 1 as a deflecting element, beam spot positions on the object scanning surface (photoconductive drum surface) 16 can be moved in the sub scanning direction.

[Displacement of Beam Waist Positions Under Temperature Variations]

(Displacement of Beam Waist Positions)

FIGS. 6A through 6C illustrate light paths from the semiconductor laser 11 to the object scanning surface (photoconductive drum surface) 16. Behaviors of beam waist positions under temperature variations within the optical housing 17 are described with reference to FIGS. 6A through 6C and FIG. 2 illustrating the optical scanning device 20.

As shown in FIG. 2, the optical scanning device 20 includes a light source unit 18, the cylindrical lens 13, the polygon mirror (deflector) 14, and the scanning optical system 15, which are housed inside the optical housing 17.

Figure 3:
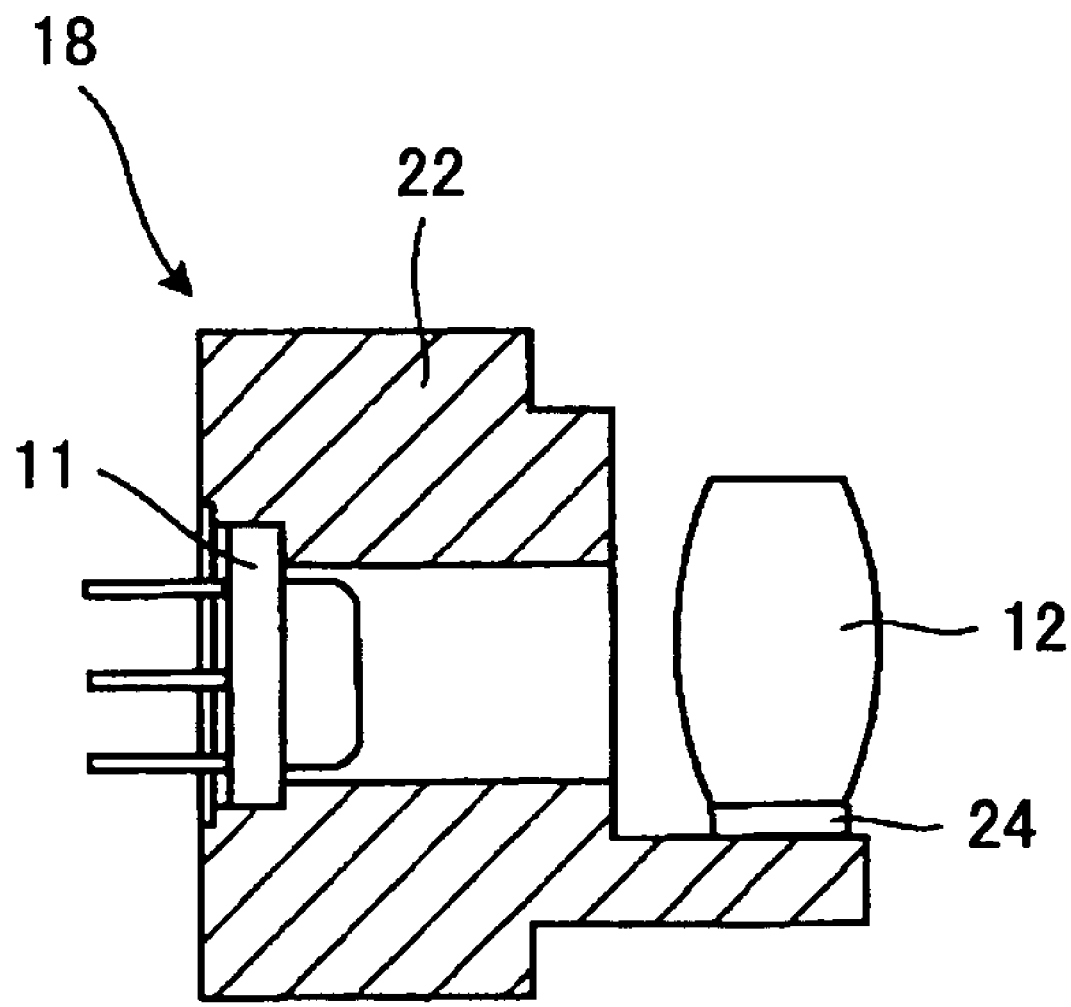
FIG. 3 is a cut-away side view of a light source unit.

As shown in FIG. 3, the semiconductor laser 11 and the coupling lens 12 are provided integrally in the light source unit 18. Specifically, the semiconductor laser 11 is held by a base member 22, and the coupling lens 12 is fixed to the base member 22 with adhesive 24.

The polygon mirror 14 is assembled with a not shown polygon motor, and is revolved at a speed of several ten thousand rpm. Accordingly, the temperature within the optical housing 17 rises due to heat generated from a driving IC of the polygon motor and/or heat caused by friction with air as the polygon mirror 14 rotates. When the optical scanning device 20 is installed in, for example, a laser printer employing an electrophotographic process, heat from an external heat source may affect the temperature within the optical housing 17. For example, heat is generated by a fixing device that fixes toner onto a recording sheet.

The above described temperature variations cause the optical housing 17 and/or optical elements housed in the optical housing 17 to expand or contract. As a result, beam waist positions are displaced near the object scanning surface (photoconductive drum surface) 16.

The displacement is described with reference to FIGS. 6A through 6C. In FIGS. 6A through 6C, the upper levels illustrate a light path (light flux) in the main scanning direction, and the lower levels illustrate a light path (light flux) in the sub scanning direction. In each of FIGS. 6A through 6C, a light path reflected at the polygon mirror 14 is unfolded (straightened) and shown schematically (among light paths deflected at the polygon mirror 14 to scan the object scanning surface (photoconductive drum surface) 16, a light path (and optical elements), e.g., reaching the mid portion of the height of an image, is shown in a linear manner).

FIGS. 6A through 6C schematically illustrate a factor that is necessary for describing effects of an embodiment of the present invention, i.e., "fluctuations of the thickness of a laser beam (width of light flux) caused by deformation and/or changes in the refraction index of resin lenses according to temperature variations". FIGS. 6A through 6C do not illustrate factors that are unnecessary for describing effects of an embodiment of the present invention, i.e., "fluctuations of the width of a light flux caused by deformation and/or changes in the refraction index of glass lenses, and changes in intervals between optical elements".

The widths of the light fluxes are appropriately magnified in each of FIGS. 6A through 6C by different magnification ratios; therefore, the widths cannot be compared relatively.

As shown in FIG. 6B, under normal temperature (25° C.), in both the main scanning direction and the sub scanning direction, the beam waist positions are positioned (focused) on the object scanning surface 16.

When the temperature rises (45° C., FIG. 6A), the resin-lens scanning optical system 15 expands due to heat, and therefore, the focusing power thereof decreases (focal length increases). As a result, beam waist positions are displaced in a direction away from the polygon mirror 14 in both the main scanning direction and the sub scanning direction.

When the temperature falls (5° C., FIG. 6C), beam waist positions are displaced in a direction toward the polygon mirror 14.

Generally, the curvature radius of each optical element is different between the main scanning direction and the sub scanning direction. Therefore, positional displacement amounts of beam waist positions are different between the main scanning direction and the sub scanning direction. When the optical scanning device 20 is used as an exposing device in an image forming apparatus, a beam spot exposed onto a photoconductor surface moves along in a main scanning direction. Accordingly, the spot diameter of the exposing beam (scanning beam) in the main scanning direction becomes larger compared to when the beam spot is in a still status.

Accordingly, the diameter of the beam spot in a still status is made shorter in the main scanning direction than in the sub scanning direction, so as to prioritize the mitigation of fluctuations of the beam waist positions in the main scanning direction over those in the sub scanning direction. Usually, in order to mitigate fluctuations of the beam waist positions in the main scanning direction, an appropriate material (appropriate coefficient of thermal expansion) from which a holding member holding the optical elements is made is selected, and the optical system is designed according to the selected material.

For the examples shown in FIGS. 6A through 6C, it is effective to select an appropriate material for the base material 22 holding the semiconductor laser 11 and the coupling lens 12 in an integral manner.

(Addition of Liquid Crystal Element)

Behaviors of beam waist positions when the liquid crystal element 43 is added to the optical system shown in FIGS. 6A through 6C are described with reference to FIGS. 4A through 4C and FIGS. 5A through 5C. FIGS. 5A through 5C illustrate a comparative example compared with an embodiment of the present invention, and FIGS. 4A through 4C illustrate a configuration of an embodiment of the present invention.

COMPARATIVE EXAMPLE

Liquid Crystal Element Having Outer Shape with Aspect Ratio of c=1

Assuming that the outer shape (i.e., glass substrate) of the liquid crystal element 43 has a length "a" in the main scanning direction, a length "b" in the sub scanning direction, and the aspect ratio is c=a/b, the liquid crystal element 43 employed in the comparative example shown in FIGS. 5A through 5C has an aspect ratio c=1.

As described above, a liquid crystal element has a cell structure in which a liquid crystal layer of several µm to several tens µm is sealed by two glass substrates (transparent substrates). Therefore, when the temperature in the environment changes, the liquid crystal layer having a relatively high expansion coefficient expands due to heat as the temperature rises in the environment, such that the middle part of the liquid crystal element expands. When the aspect ratio is c=1, the liquid crystal element deforms such that the curvature radius becomes the same in the main scanning direction and the sub scanning direction (rotational symmetric shape); therefore, the same amount of the positive power is generated by the liquid crystal element in the main scanning direction and the sub scanning direction.

Therefore, when the liquid crystal element 43 described in the comparative example is added to the optical system shown in FIGS. 6A through 6C, positional displacement amounts of the beam waist positions in the main scanning direction and the sub scanning direction cannot be made equal. It is not possible to mitigate displacement of beam waist positions in the main scanning direction and the sub scanning direction at the same time. As described above, when the beam spot moves, the spot diameter of the exposing beam (scanning beam) in the main scanning direction becomes larger compared to when the beam spot is in a still status.

Accordingly, the outer shape of the liquid crystal element of the first embodiment is made to have a different aspect ratio (c≠1).

Specifically, the outer shape of the liquid crystal element is made to have a different aspect ratio from the comparative example, so that power components generated are different between the main scanning direction and the sub scanning direction as the liquid crystal element expands and contracts due to temperature variations. As a result, the displacement amounts of beam waist positions in the main scanning direction and the sub scanning direction can be made substantially equal.

FIGS. 4A through 4C illustrate an optical system in which the liquid crystal element 43 is added to the optical system shown in FIGS. 6A through 6C. The liquid crystal element 43 shown in FIGS. 4A through 4C has an aspect ratio satisfying c=a/b>1. Accordingly, the power component generated in the liquid crystal element 43 in the sub scanning direction is larger than that in the main scanning direction as the temperature varies.

Further, an appropriate material (appropriate coefficient of thermal expansion) is selected for the base member 22, so that displacement of beam waist positions is effectively prevented in both the main scanning direction and the sub scanning direction.

In other words, if a component of beam waist position displacement provided by the liquid crystal element is removed, beam waist positions of the optical system are displaced due to temperature variations by different amounts in the main scanning direction and the sub scanning direction.

(Example Values)

The following describes example values of displacement amounts of beam waist positions as the temperature within the optical housing 17 changes from 25° C. to 45° C. It is assumed that the temperature of the light source unit 18, the liquid crystal element 43, the cylindrical lens 13, the polygon mirror 14, a first scanning lens 15-1, and a second scanning lens 15-2 in the optical housing 17 changes.

Specific example values for the optical scanning device 20 are described by indicating optical system data, with reference to Tables 1 and 2.

#1 "Optical System Without Liquid Crystal Element; Shown in FIGS. 6A Through 6C"

The oscillation wavelength of the semiconductor laser 11 is 655 nm, and the focal length fcol of the coupling lens 12 is 15 mm (normal temperature; 25° C.). A first surface and a second surface of the coupling lens 12 are coaxial aspherical surfaces, and wave front aberrations of the coupling lens 12 are corrected, although not indicated by specific values. Light fluxes projected from the coupling lens 12 are coupled into parallel light fluxes.

Beam shaping is performed on the laser beam from the coupling lens 12 at a not shown aperture. The laser beam is focused on the polygon mirror 14 as a long line image in the main scanning direction by the function of the cylindrical lens 13.

A distance between the second surface of the coupling lens 12 and the aperture is 10 mm, and a distance between the aperture and a first surface of the cylindrical lens 13 is 37.3 mm.

Tables 1 and 2 include optical system data between the coupling lens 12 and the object scanning surface 16.

TABLE 1

| | Surface no. | | | 10° C. | 25° C. | 45° C. | Note |
|---|---|---|---|---|---|---|---|
| cylindrical lens 13 | 2 | r:1 | sub | 64.49 | 64.50 | 64.51 | Glass-made |
| | | | refraction index | 1.51439 | 1.51433 | 1.51425 | α = 7.5E−06 [1/° C.] |
| first scanning lens 15-1 | 6 | r:1 | coaxial | −312.27 | −312.60 | −313.04 | Resin-made |
| | 7 | r:2 | coaxial | −82.91 | −83.00 | −83.12 | α = 7.0E−05 [1/° C.] |
| | | | refraction index | 1.52888 | 1.52716 | 1.52535 | |
| second scanning lens 15-2 | 8 | r:1 | main | −499.48 | −500.00 | −500.70 | |
| | | | sub | −47.65 | −47.70 | −47.77 | |
| | 9 | r:2 | main | −998.95 | −1000.00 | −1001.40 | |
| | | | sub | −23.38 | −23.40 | −23.43 | |
| | | | refraction index | 1.52888 | 1.52716 | 1.52535 | |

Note:
Although not shown as values, aspherical surface coefficients also change according to linear expansion coefficients.
Coaxial indicates rotational symmetry.

TABLE 2

| Surface no. | Rm [mm] | Rs [mm] | X [mm] | N (25° C.) | Note | |
|---|---|---|---|---|---|---|
| 3 | ∞ | 64.5 | 3.0 | 1.514 | cylindrical lens 13 | (incident surface) |
| 4 | ∞ | ∞ | 124.9 | | | (projection surface) |
| 5 | ∞ | ∞ | 62.8 | (reflection) | polygon mirror 14 | (reflection surface) |
| 6* | −312.6 | ← | 31.4 | 1.527 | first scanning lens 15-1 | (incident surface) |
| 7* | −83.0 | ← | 78.0 | | | (projection surface) |
| 8* | −500.0 | −47.7 | 3.5 | 1.527 | second scanning lens 15-2 | (incident surface) |
| 9* | −1000.0 | −23.4 | 142.3 | | | (projection surface) |
| 10 | — | — | — | | object scanning surface (photoconductive drum surface) 16 | |

A surface no. with an asterisk * indicates that the surface is aspherical.

The cylindrical lens 13 is made of glass, and the first scanning lens 15-1 and the second scanning lens 15-2 are made of resin, and linear expansion coefficients a thereof are indicated in Table 1.

In Table 2, Rm is a curvature radius in the main scanning direction, Rs is a curvature radius in the sub scanning direction, and N is a refraction index in the wavelength being used. The side of the cylindrical lens 13 on which a laser beam is incident is surface no. 3, the side of the cylindrical lens 13 from which a laser beam is projected is surface no. 4, the deflecting reflection surface of the polygon mirror 14 is surface no. 5, the side of the first scanning lens 15-1 on which a laser beam is incident is surface no. 6, the side of the first scanning lens 15-1 from which a laser beam is projected is surface no. 7, the side of the second scanning lens 15-2 on which a laser beam is incident is surface no. 8, the side of the second scanning lens 15-2 from which a laser beam is projected is surface no. 9, and the object scanning surface 16 is surface no. 10.

With regard to a laser beam that reaches the position corresponding to the image height H=0, the angle between the beam incident on the polygon mirror 14 and the beam reflected from the polygon mirror 14 is 60°.

In the optical system of this configuration, as the temperature rises from 25° C. to 45° C., the beam waist positions are displaced as follows:
  main scanning direction: +0.56 [mm];
  sub scanning direction: +1.12 [mm].
The positive sign (+) indicates that the beam waist position moves in a direction away from the polygon mirror 14.

2 "Comparative Example; Shown in FIGS. 5A Through 5C"

The optical system in which the liquid crystal element 43 is added to the configuration shown in FIGS. 6A through 6C (Table 2) is described below. The liquid crystal element 43 is arranged such that the distance between the aperture and the liquid crystal element 43 is 8.3 mm (distance between the liquid crystal element 43 and the first surface of the cylindrical lens 13 is 29 mm).

The liquid crystal element 43 has a cell structure in which a liquid crystal layer is sealed by two glass substrates. Accordingly, as temperature rises, the middle part of the liquid crystal element expands, and a lens effect (positive power) is generated. An experiment was conducted by using a liquid crystal element including a liquid crystal layer having a layer thickness of several tens [μm] sealed by two glass substrates having dimensions of length×width: 16×16 [mm] (thickness: 0.5 [mm]). When the temperature rose by 20° C. (25° C. to 45° C.), the incident surface (or projection surface) of the liquid crystal element, which surface is planar at 25° C., is deformed at 45° C., by an amount corresponding to a curvature radius R=40,000 [mm] (converted to transmission wavefront aberration, a spherical surface corresponding to λ/0.8; λ=655 nm).

A power component of the liquid crystal element 43 is added to the optical system of the comparative example. Accordingly, as the temperature rose from 25° C. to 45° C., beam waist positions were displaced as follows:
  main scanning direction: −0.07 [mm]; a negative sign (−) indicates that the beam waist positions move in a direction toward the polygon mirror 14;
  sub scanning direction: +0.86 [mm].

3 "First Embodiment; Shown in FIGS. 4A Through 4C"

In the comparative example, displacement of beam waist positions is reduced compared to the example without the liquid crystal element. However, the displacement of beam waist positions in the sub scanning direction is not sufficiently prevented compared to that in the main scanning direction.

Accordingly, the liquid crystal element 43 is made to have a different outer shape (aspect ratio c) in the first embodiment, i.e., length in the main scanning direction a=16 [mm], length in the sub scanning direction b=8 [mm], aspect ratio c=a/b=2≠1. Under such a condition, when the temperature rises from 25° C. to 45° C., the curvature radii are as follows:
  main scanning direction: R main=40,000 [mm];
  sub scanning direction: R sub=10,000 [mm].
As a result, displacement of the beam waist positions is reduced to the following values:
  main scanning direction: −0.07 [mm];
  sub scanning direction: +0.11 [mm].

In addition, displacement of beam waist positions can be further reduced by selecting an appropriate material (appropriate coefficient of thermal expansion) for the base member 22 holding the semiconductor laser 11 and the coupling lens 12.

As can be appreciated from Table 3 shown below, by designing the outer shape (aspect ratio) of the liquid crystal element in accordance with properties of the optical system (displacement of beam waist positions according to temperature variations) with which the liquid crystal element is combined as in the first embodiment, and optimizing the material of the holder member holding the optical elements, it is possible to effectively prevent displacement of beam waist positions.

TABLE 3

| Outer shape of liquid crystal element | | Displacement amounts of beam waist positions | |
|---|---|---|---|
| | | main scanning direction | sub scanning direction |
| Optical system without liquid crystal element | no liquid crystal element | +0.56 | +1.12 |
| Comparative example | main × sub: 16 × 16 [mm] | −0.07 | +0.86 |
| First embodiment of present invention | main × sub: 16 × 8 [mm] | −0.07 | +0.11 |

(Other Examples of Liquid Crystal Element Shape)

In the first embodiment, the outer shape of the liquid crystal element, i.e. the aspect ratio of the glass substrates included in the liquid crystal element, is examined. However, as described above, a liquid crystal element generally includes a liquid crystal layer sealed by two glass substrates with a sealing member.

Therefore, the shape of the glass substrate does not need to be optimized; it is possible to optimize the shape of the area where the liquid crystal layer is sealed (area enclosed by the seal member) (second embodiment).

For example, considering the process of assembling components onto the holder member, the outer shape of the liquid crystal element can be a square (aspect ratio c=a/b=1), and the area where the liquid crystal layer is sealed can have a rectangular shape where the aspect ratio is c1≠1.

In the area where the liquid crystal layer is sealed, it is assumed that the aspect ratio is c1=a1/b1, where the length in the main scanning direction is a1 and the length in the sub scanning direction is b1.

Further, the outer shape of the glass substrates and the shape of area where the liquid crystal layer is sealed in one way or both ways do not need to be rectangular.

For example, this area can be an oval shape whose major axis and minor axis have different lengths as shown in FIG. 7A, or an elongated circular shape as shown in FIG. 7B. In FIGS. 7A, 7B, the liquid crystal layer is denoted by 25 and the seal member is denoted by 26.

Generally, the outer shape of the glass substrates and the shape of the area where the liquid crystal layer is sealed in one way or both ways are preferably linearly symmetric in the main scanning direction and the sub scanning direction.

Specifically, it is important that at least either one of the aspect ratio c or the aspect ratio c1 be a value other than one.

Figure 8A:
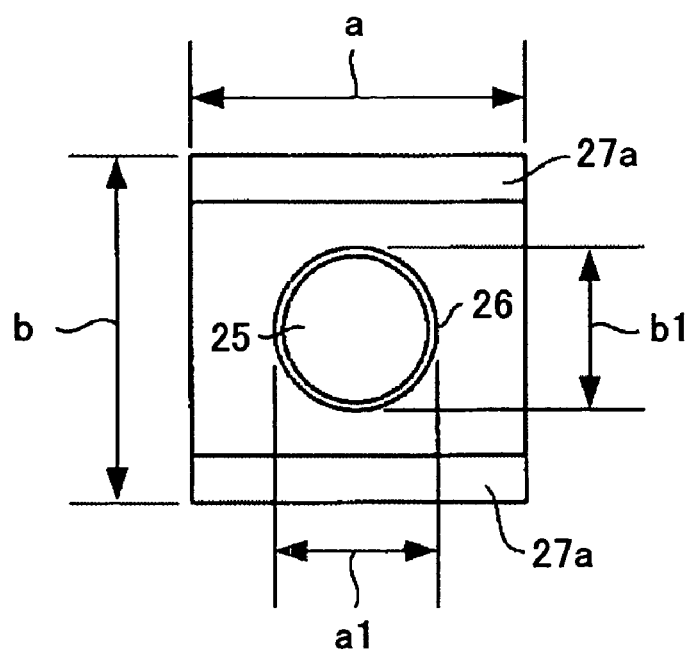
FIGS. 8A, 8B are schematic diagrams of shapes of liquid crystal elements according to a third embodiment of the present invention.
Figure 8B:
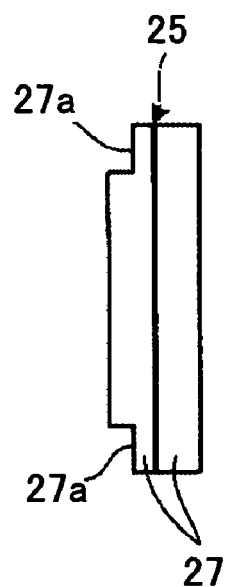

Further, as shown in FIGS. 8A, 8B, structurally fragile portions (notched portions 27a) are provided in a linearly symmetric arrangement by notching part of a glass substrate 27, which is a transparent substrate (notched at the top and bottom as viewed in FIGS. 8A, 8B). Accordingly, the liquid crystal element 43 generates different power components in the main scanning direction and the sub scanning direction under temperature variations (third embodiment).

With this configuration, the aspect ratios can be c=1 (square glass substrate) and c1=1 (area where the liquid crystal layer is sealed).

(Example of Multi-Beam Optical Scanning Device)

The above embodiments are described based on a "single beam optical scanning device", in which scanning is performed with a single beam.

In recent years and continuing, laser printers and digital copiers are required to print at higher speed with higher printing density. To achieve these requirements, "multi-beam optical scanning devices" have become mainstream, in which plural laser beams are used for scanning.

Figure 9:
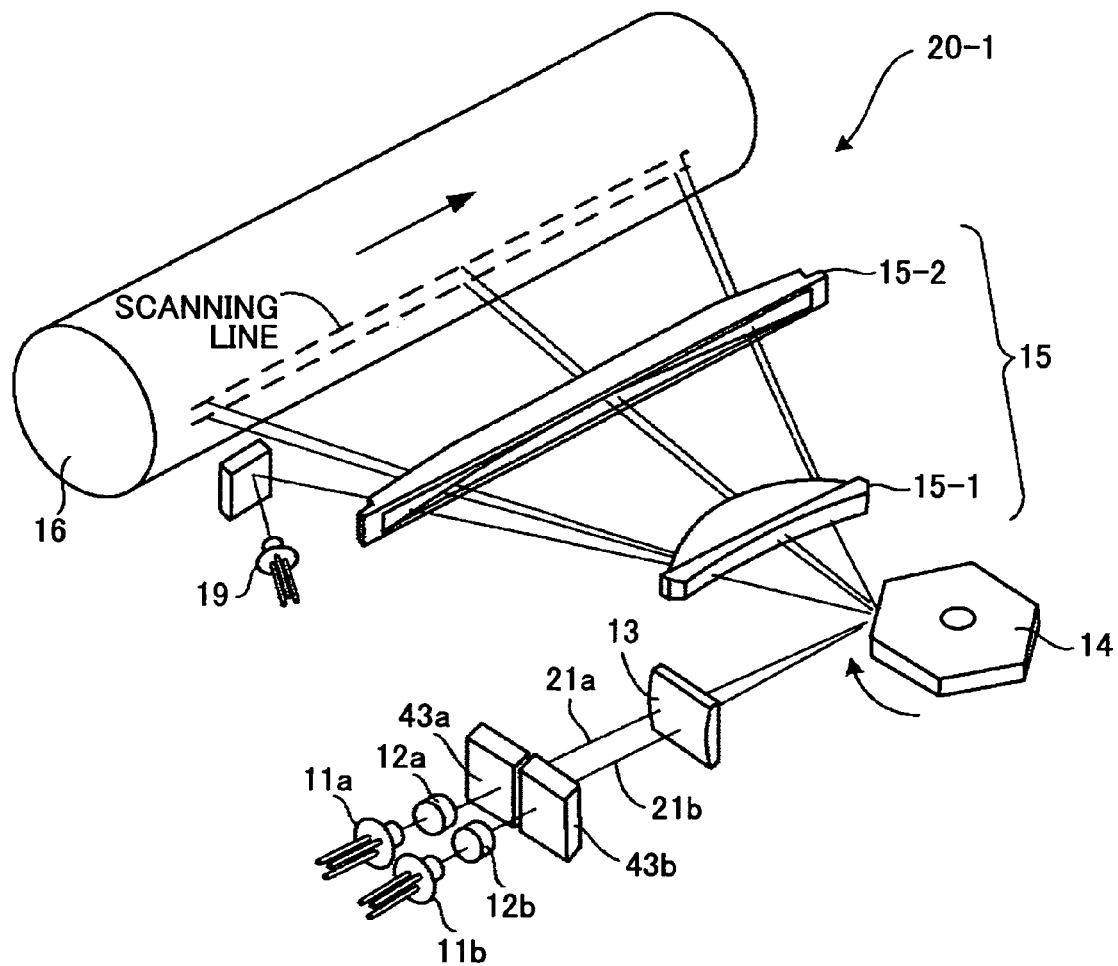
FIG. 9 is a perspective view of an optical scanning device according to a fourth embodiment of the present invention.

FIG. 9 is a perspective view of a multi-beam optical scanning device 20-1 in which two laser beams are used simultaneously for scanning (fourth embodiment).

Two laser beams 21a, 21b are projected from two semiconductor lasers 11a, 11b and travel through coupling lenses 12a, 12b, respectively. The laser beams 21a, 21b are focused as line images (focused in a sub scanning direction, and longitudinal in the main scanning direction) on a deflecting reflection surface of the polygon mirror 14 by the function of the common cylindrical lens 13. The scanning optical system (scanning lenses) 15 causes the laser beams 21a, 21b to scan the object scanning surface (photoconductive drum surface) 16 as beam spots.

In the multi-beam optical scanning device 20-1, the two laser beams 21a, 21b are guided to the common object scanning surface (photoconductive drum surface) 16.

In such a "multi-beam optical scanning device" in which plural laser beams scan a common object scanning surface, a liquid crystal element having a deflecting function is arranged on at least the light path of one laser beam. By driving and controlling the liquid crystal elements, it is possible to correct intervals between plural beams on the object scanning surface (scanning line intervals) to be predetermined values.

Accordingly, a "multi-beam optical scanning device" can be provided, in which scanning line intervals can be maintained at high precision while scanning with plural beams.

When such a multi-beam optical scanning device is used as an exposing device in an image forming apparatus, it is more advantageous compared to using the single beam optical scanning device. Specifically, the number of revolutions of the polygon scanner for the same number of output prints can be reduced, which reduces heat, noise, power consumption, and energy. With the deflecting function of the liquid crystal element, beam spot positions on the photoconductor surface can be corrected, so that scanning line intervals can be maintained with high precision, and high-quality output images with reduced displacement of beam waist positions (i.e., less changes in beam spot diameters) can be obtained.

Further, when the multi-beam optical scanning device is used as an exposing device in an image forming apparatus, it is possible to switch the scanning density (switch between high speed and high density) according to a request from the operator (user). The configuration shown in FIG. 9 includes liquid crystal elements provided on light paths for all (two) laser beams; however, the number of liquid crystal elements can be reduced according to need.

(Example of Four-Drum Tandem-Type Image Forming Apparatus)

In the above example of the multi-beam optical scanning device, plural laser beams projected from plural light sources scan a common object scanning surface; however, the plural laser beams can be guided to different object scanning surfaces.

The optical scanning device can be used as an exposing device in a four-drum tandem-type image forming apparatus employing an electrophotographic process (fifth embodiment).

Figure 10:
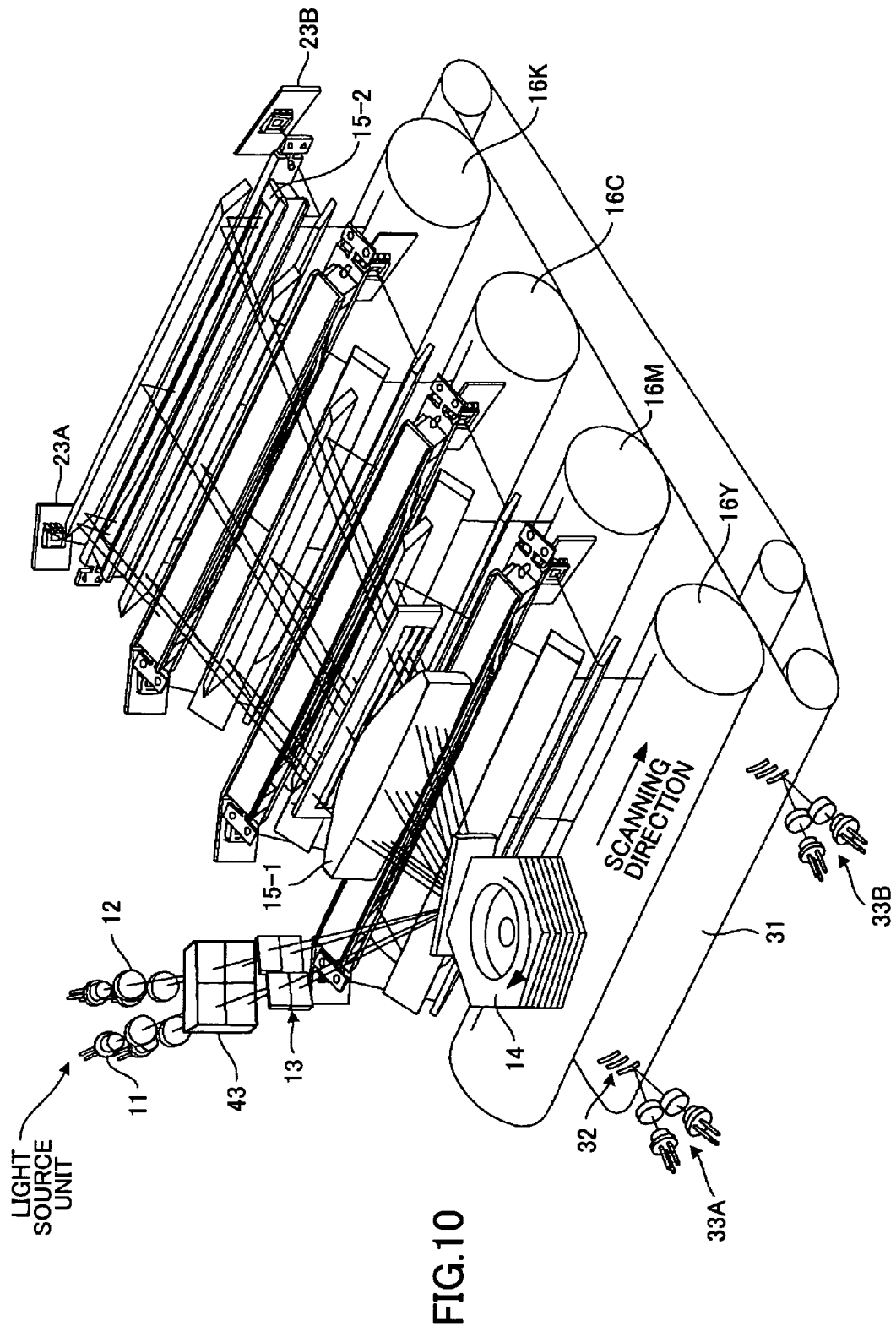
FIG. 10 is a perspective view of part of an image forming apparatus according to a fifth embodiment of the present invention.

A four-drum tandem-type image forming apparatus is described with reference to FIG. 10. Descriptions of conventional technologies such as charging, exposing, developing, transferring, and fixing, which are unnecessary for describing the embodiment of the present invention, are omitted.

A tandem-type full-color copier includes four photoconductive drums 16Y, 16M, 16C, and 16K, corresponding to yellow (Y), magenta (M), cyan (C), and black (K), respectively. The photoconductive drums are arranged along a conveying surface of a transfer belt 31. The optical scanning device irradiates laser beams for scanning corresponding photoconductive drums, thereby forming electrostatic latent images on the circumferential surfaces of the photoconductive drums. The latent images are made visible with toner of corresponding colors. The visible toner images are sequentially transferred onto a recording sheet conveyed by the transfer belt 31 so as to form a multi-color image.

Thus, image quality is degraded and color deviations occur if scanning line positions are displaced in the sub scanning direction by different amounts between the colors.

In the fifth embodiment, color deviation detecting sensors 33A, 33B are employed as a color deviation detecting unit. Color deviation can be quantitatively measured by forming predetermined toner marks (color deviation detecting toner images) 32 corresponding to each color (each photoconductor) on a sheet between output sheets being conveyed by the transfer belt 31, and detecting the toner marks with the color deviation detecting sensors 33A, 33B.

Another method is to detect scanning positions of laser beams scanning the photoconductive drums 16Y, 16M, 16C, 16K, by using positional displacement detecting sensors 23A, 23B provided on one or both of an optical scanning start side and an optical scanning end side for each deflecting reflection surface of the polygon mirror 14.

The liquid crystal elements are controlled based on detection results obtained by using one of or a combination of these detectors, so that color deviations can be corrected.

Rotation of the polygon mirror 14 and rotations of the photoconductive drums 16Y, 16M, 16C, 16K are generally not synchronized. Therefore, when optical writing (optical scanning) starts based on timing signals output from the positional displacement detecting sensors 23A, 23B also serving as synchronization detecting sensors, scanning positions tend to be displaced in the sub scanning direction. The maximum displacement corresponds to half the distance of one scan from the deflecting reflection surfaces of the polygon mirror 14.

Even under these conditions, failures (color deviations) can be resolved by controlling liquid crystal elements based on detection results obtained by detecting color deviations of toner images on the transfer belt 31 and/or scanning positions at the optical scanning start side and the optical scanning end side.

By driving the liquid crystal elements, an output image with reduced color deviations can be obtained. Therefore, the frequency of detecting color deviations caused by different scanning line positions between photoconductors can be reduced. As a result, the additional amount of toner consumed for detecting color deviations can be reduced, which contributes to environmental protection.

Further, displacement of beam waist positions can be reduced (i.e., less changes in beam spot diameters), thereby maintaining high quality in the output images.

The present invention is not limited to the specifically disclosed embodiments, and variations and modifications may be made without departing from the scope of the present invention.

The present application is based on Japanese Priority Patent Application No. 2005-295330, filed on Oct. 7, 2005, the entire contents of which are hereby incorporated by reference.

What is claimed is:

1. An optical scanning device for scanning an object scanning surface with a light beam projected from a light source and traveling through an optical system, the optical scanning device comprising:
   a liquid crystal element configured to modulate a phase of the light beam, the liquid crystal element being driven by electric signals and provided on a light path of the light beam between the light source and the object scanning surface;
   the liquid crystal element generates power components which, according to temperature variations, vary by different amounts in a main scanning direction of the light path and a sub scanning direction of the light path to cause different amounts of displacement of beam waist positions, according to the temperature variations, in the main scanning direction and the sub scanning direction;
   the liquid crystal element includes a liquid crystal layer sandwiched by at least two transparent substrates and a seal member sealing the liquid crystal layer between the transparent substrates, the seal member separate from the transparent substrates and enclosing a seal area within a portion of a substrate area enclosed by the transparent substrates;
   the substrate area enclosed by the transparent substrates has a length "a" in the main scanning direction, a length "b" in the sub scanning direction, and an aspect ratio $c=a/b$, where $c \neq 1$; and
   the aspect ratio c is specified such that the amounts of displacement of beam waist positions, caused by the temperature variations in the main scanning direction and the sub scanning direction, correct amounts of displacement of beam waist positions resulting from optical components other than the liquid crystal element.

2. The optical scanning device according to claim 1, wherein the beam waist positions of the optical system are displaced due to temperature variations by different amounts in the main scanning direction and the sub scanning direction when a component of beam waist position displacement provided by the liquid crystal element is removed.

3. The optical scanning device according to claim 1, wherein the substrate area enclosed by the transparent substrates has a linearly symmetric shape.

4. The optical scanning device according to claim 3, wherein the substrate area enclosed by the transparent substrates has any one of a rectangular shape, an oval shape, and an elongated circular shape.

5. The optical scanning device according to claim 1, wherein the liquid crystal element is further configured to deflect a path of the light beam.

6. An image forming apparatus for forming an image on an image carrier by using as an exposing device the optical scanning device according to claim 1.

7. The optical scanning device according to claim 1, wherein $c>1$.

8. The optical scanning device according to claim 1, wherein the optical components other than the liquid crystal element include a resin-based scanning lens.

9. The optical scanning device according to claim 8, wherein
along the light path, the liquid crystal element is positioned before a deflector, and
the resin-based scanning lens is positioned after the deflector, between the deflector and the object scanning surface.

10. An optical scanning device for scanning an object scanning surface with a light beam projected from a light source and traveling through an optical system, the optical scanning device comprising:
a liquid crystal element configured to modulate a phase of the light beam, the liquid crystal element being driven by electric signals and provided on a light path of the light beam between the light source and the object scanning surface;
the liquid crystal element generates power components which, according to temperature variations, vary by different amounts in a main scanning direction of the light path and a sub scanning direction of the light path to cause different amounts of displacement of beam waist positions, according to the temperature variations, in the main scanning direction and the sub scanning direction;
the liquid crystal element includes a liquid crystal layer sandwiched by at least two transparent substrates and a seal member sealing the liquid crystal layer between the transparent substrates, the seal member separate from the transparent substrates and enclosing a seal area within a portion of a substrate area enclosed by the transparent substrates; and
at least one of the transparent substrates includes notched portions provided in a linearly symmetric arrangement such that the liquid crystal element generates the different power components in the main scanning direction and the sub scanning direction to cause different amounts of displacement of beam waist positions, according to the temperature variations, in the main scanning direction and the sub scanning direction to correct amounts of displacement of beam waist positions resulting from optical components other than the liquid crystal element.

11. An optical scanning device for scanning an object scanning surface with a light beam projected from a light source and traveling through an optical system, the optical scanning device comprising:
a liquid crystal element configured to modulate a phase of the light beam, the liquid crystal element being driven by electric signals and provided on a light path of the light beam between the light source and the object scanning surface;
the liquid crystal element generates power components which, according to temperature variations, vary by different amounts in a main scanning direction of the light path and a sub scanning direction of the light path to cause different amounts of displacement of beam waist positions, according to the temperature variations, in the main scanning direction and the sub scanning direction;
the liquid crystal element includes a liquid crystal layer sandwiched by at least two transparent substrates and a seal member enclosing the liquid crystal layer between the transparent substrates, the seal member separate from the transparent substrates and enclosing a seal area within a portion of a substrate area enclosed by the transparent substrates;
the seal area enclosed by the seal member forms a shape of the liquid crystal layer with a length "a" in the main scanning direction, a length "b" in the sub scanning direction, and an aspect ratio $c=a/b$, where $c \neq 1$; and
the aspect ratio c is specified such that the amounts of displacement of beam waist positions, caused by the temperature variations in the main scanning direction and the sub scanning direction, correct amounts of displacement of beam waist positions resulting from optical components other than the liquid crystal element.

12. The optical scanning device according to claim 11, wherein the seal area enclosed by the seal member has a linearly symmetric shape.

13. The optical scanning device according to claim 12, wherein the seal area enclosed by the seal member has any one of a rectangular shape, an oval shape, and an elongated circular shape.

14. A method of scanning an object scanning surface with a light beam projected from a light source and traveling through an optical system by an optical scanning device, the method comprising:
modulating a phase of the light beam by a liquid crystal element which is driven by electric signals and provided on a light path of the light beam between the light source and the object scanning surface;
generating, by the liquid crystal element, power components which, according to temperature variations, vary by different amounts in a main scanning direction of the light path and a sub scanning direction of the light path to cause different amounts of displacement of beam waist positions, according to the temperature variations, in the main scanning direction and the sub scanning direction, the liquid crystal element including a liquid crystal layer sandwiched by at least two transparent substrates and a seal member sealing the liquid crystal layer between the transparent substrates, the seal member separate from the transparent substrates and enclosing a seal area within a portion of a substrate area enclosed by the transparent substrates, wherein
the substrate area enclosed by the transparent substrates has a length "a" in the main scanning direction, a length "b" in the sub scanning direction, and an aspect ratio $c=a/b$, where $c \neq 1$; and
the aspect ratio c is specified such that the amounts of displacement of beam waist positions caused by the temperature variations in the main scanning direction and the sub scanning direction, correct amounts of displacement of beam waist positions resulting from optical components other than the liquid crystal element.

15. The method according to claim 14, wherein the substrate area enclosed by the transparent substrates has a linearly symmetric shape.

16. The method according to claim 15, wherein the substrate area enclosed by the transparent substrates has any one of a rectangular shape, an oval shape, and an elongated circular shape.

17. The method according to claim 14, further comprising:
displacing the beam waist positions of the optical system due to temperature variations by different amounts in the main scanning direction and the sub scanning direction by removing a component of beam waist position displacement provided by the liquid crystal element.

18. The method according to claim 14, further comprising:
deflecting a path of the light beam by the liquid crystal element.

19. A method of scanning an object scanning surface with a light beam projected from a light source and traveling through an optical system by an optical scanning device, the method comprising:

modulating a phase of the light beam by a liquid crystal element which is driven by electric signals and provided on a light path of the light beam between the light source and the object scanning surface;

generating, by the liquid crystal element, power components which, according to temperature variations, vary by different amounts in a main scanning direction of the light path and a sub scanning direction of the light path to cause different amounts of displacement of beam waist positions, according to the temperature variations, in the main scanning direction and the sub scanning direction, the liquid crystal element including a liquid crystal layer sandwiched by at least two transparent substrates and a seal member enclosing the liquid crystal layer between the transparent substrates, the seal member separate from the transparent substrates and enclosing a seal area within a portion of a substrate area enclosed by the transparent substrates, wherein the seal area enclosed by the seal member forms a shape of the liquid crystal layer having a length "a" in the main scanning direction, a length "b" in the sub scanning direction, and an aspect ratio c=a/b, where c≠1, and the aspect ratio c is specified such that the amounts of displacement of beam waist positions, caused by the temperature variations in the main scanning direction and the sub scanning direction, correct amounts of displacement of beam waist positions resulting from optical components other than the liquid crystal element.

20. The method according to claim 19, wherein the seal area enclosed by the seal member has a linearly symmetric shape.

21. The optical scanning device according to claim 20, wherein the seal area enclosed by transparent substrates has any one of a rectangular shape, an oval shape, and an elongated circular shape.

22. A method of scanning an object scanning surface with a light beam projected from a light source and traveling through an optical system by an optical scanning device, the method comprising:

modulating a phase of the light beam by a liquid crystal element which is driven by electric signals and provided on a light path of the light beam between the light source and the object scanning surface;

generating, by the liquid crystal element, power components which, according to temperature variations, vary by different amounts in a main scanning direction of the light path and a sub scanning direction of the light path to cause different amounts of displacement of beam waist positions, according to the temperature variations, in the main scanning direction and the sub scanning direction, the liquid crystal element including a liquid crystal layer sandwiched by at least two transparent substrates and a seal member sealing the liquid crystal layer between the transparent substrates, the seal member separate from the transparent substrates and enclosing a seal area within a portion of a substrate area enclosed by the transparent substrates, wherein at least one of the transparent substrates includes notched portions provided in a linearly symmetric arrangement such that the liquid crystal element generates the different power components in the main scanning direction and the sub scanning direction to cause different amounts of displacement of beam waist positions, according to the temperature variations, in the main scanning direction and the sub scanning direction to correct amounts of displacement of beam waist positions resulting from optical components other than the liquid crystal element.

* * * * *